(12) United States Patent
Sotzing et al.

(10) Patent No.: US 8,760,748 B2
(45) Date of Patent: Jun. 24, 2014

(54) STRETCHABLE DEVICES AND METHODS OF MANUFACTURE AND USE THEREOF

(75) Inventors: Gregory A. Sotzing, Mansfield Center, CT (US); Yujie Ding, Ashford, CT (US)

(73) Assignee: The University of Connecticut, Farmington, CT (US)

(*) Notice: Subject to any disclaimer, the term of this patent is extended or adjusted under 35 U.S.C. 154(b) by 191 days.

(21) Appl. No.: 13/362,386

(22) Filed: Jan. 31, 2012

(65) Prior Publication Data

US 2012/0224247 A1 Sep. 6, 2012

Related U.S. Application Data

(60) Provisional application No. 61/448,293, filed on Mar. 2, 2011.

(51) Int. Cl.
*G02F 1/15* (2006.01)

(52) U.S. Cl.
USPC .......................................................... 359/265

(58) Field of Classification Search
USPC .......................................................... 359/265
See application file for complete search history.

(56) References Cited

U.S. PATENT DOCUMENTS

| | | | |
|---|---|---|---|
| 4,983,814 A | 1/1991 | Ohgushi et al. |
| 6,072,619 A | 6/2000 | Kiryuschev et al. |
| 6,103,640 A | 8/2000 | Yoshikawa et al. |
| 6,919,105 B2 | 7/2005 | Xue et al. |
| 7,321,012 B2 | 1/2008 | Sotzing |
| 7,740,656 B2 | 6/2010 | Mensah et al. |
| 8,107,153 B2 | 1/2012 | Sotzing et al. |
| 2005/0237594 A1 | 10/2005 | Ho et al. |
| 2007/0089845 A1 | 4/2007 | Sotzing et al. |
| 2010/0163283 A1 | 7/2010 | Hamedi et al. |
| 2010/0245971 A1* | 9/2010 | Sotzing et al. ................ 359/265 |
| 2010/0294335 A1 | 11/2010 | Huang et al. |
| 2011/0317240 A1 | 12/2011 | Sotzing et al. |

FOREIGN PATENT DOCUMENTS

| | | |
|---|---|---|
| WO | 0057238 | 9/2000 |
| WO | 2007008977 | 1/2007 |
| WO | 2007008978 | 1/2007 |
| WO | 2008066458 | 6/2008 |

OTHER PUBLICATIONS

Adiprene Duracast E900, Chemtura Technical Information, Oct. 20, 2008, 4 pages.
Duracure C3, Chemtura Technical Information, Sep. 8, 2008, 6 pages.
Ho et al., "Electrochromic Materials", in Proceedings of the Electrochemical Society, vol. 96-23, 1997.
Li et al., "Synthesis and characterization of mixing sof-segmented waterborne polyurethane polymer electrolyte with room temperature ionic liquid", Chinese Chemical Letters 20, 2009, pp. 519-522.
Lomax, "Breathable polyurethane membranes for textile and related industries", J. Mater. Chem. 17, 2007, pp. 2775-2784.

(Continued)

*Primary Examiner* — James Jones
(74) *Attorney, Agent, or Firm* — Cantor Colburn LLP (57) ABSTRACT

Stretchable electrochromic devices are disclosed including a stretchable electrochromic substrate; and a stretchable and transparent polymeric electrolyte coating or impregnating the stretchable electrochromic substrate. The stretchable electrochromic devices can find utility in the preparation of wearable electronic garments. Other devices using a stretchable and transparent polymeric electrolyte are disclosed.

19 Claims, 5 Drawing Sheets

(56) References Cited

OTHER PUBLICATIONS

International Search Report for International Application No. PCT/US2012/023282, International Application Filing Date Jan. 31, 2012, Date of Mailing Aug. 30, 2012, 3 pages.

Written Opinion for International Application No. PCT/US2012/023282, International Application Filing Date Jan. 31, 2012, Date of Mailing Aug. 30, 2012, 5 pages.

Rowley et al., "New Electrochromic Materials", Science Progress (2002), 85 (3), 243-262.

Rymarczyk et al., "A novel ternary polymer electrolyte for LMP batteries based on thermal cross-linked poly (urethane acrylate) in presence of a lithium salt and an ionic liquid", European Polymer Journal 44, 2008, pp. 2153-2161.

Santhosh et al., "Preparation and properties of new cross-linked polyurethane acrylate elctrolytes for lithium batteries", Journal of Power Sources 160, 2006, pp. 609-620.

Okuzaki, WIPO Publication No. WO2007099889A1_Abstract of published PCT Application No. PCT/JP2007/053467 filed on Feb. 26, 2007 and published on Sep. 7, 2007.

Ding et al., "Conductivity Trends of PRDOT-PSS Impregnated Fabric and the Effect of Conductivity on Electrochromic Textile", University of Connecticut, Department of Chemistry and the Polymer Program, pp. 1-20 (submitted in 2010).

International Search Report PCT/US2010/027956, mailed Jun. 7, 2010, 7 pages.

Invernale et al., "The Effects of Colored Base Fabric on Electrochromic Textile", University of Connecticut, Department of Chemistry and the Polymer Program, pp. 1-16, (Jan. 4, 2010).

Invernale et al., "All Organic Electrochromic Spandex", Applied Materials and Interfaces, 2(1): pp. 296-300 (Jan. 4, 2010).

Padilla et al., "Electrochemical Study of Dual Conjugated Polymer Electrochromic Devices", Journal of Electroanalytical Chemistry: 609, pp. 75-84 (2007).

Padilla et al., "Maximum Contrast from an Electrochromic Material", Electrochemistry Communications, 9(8) pp. 1931-1935 (2007).

Padilla et al., "High Contrast Solid-State Electrochromic Devices from Substituted 3, 4-Propylenedioxythiophenes Using the Dual Conjugated Polymer Approach", Synthetic Metals, 157(6-7), pp. 261-268 (2007).

Reynolds et al., "Unique Variable-Gap Polyheterocycles for High-Contrast Dual Polymer Electrochromic Devices", Synthetic Metals, 85(1-3), pp. 1295-1298 (1997).

Sapp et al., "Rapid Switching Solid State Electrochromic Devices Based on Complementary Conducting Polymer Films", Advanced Materials, 8(10), pp. 808-811 (1996).

Seshadri et al., "Optimization, Preparation, and Electrical Short Evaluation for 30 cm2 Active Area Dual Conjugated Polymer Electrochromic Windows", Organic Electronics, 8(4), pp. 367-381 (2007).

Written Opinion of International Search Report for PCT/US2010/027956, mailed Jun. 7, 2010, 7 pages.

Materials Research Society http://www.mrs.org/spring2011/ Available online Feb. 1, 2011 (1 page).

\* cited by examiner

STRETCHABLE DEVICES AND METHODS OF MANUFACTURE AND USE THEREOF

CROSS-REFERENCE TO RELATED APPLICATIONS

This application claims the benefit of U.S. Provisional Application Ser. No. 61/448,293 filed Mar. 2, 2011, which is incorporated herein by reference in its entirety.

BACKGROUND

An electrochromic device is a self-contained, two-electrode (or more) electrolytic cell that includes an electrolyte and one or more electrochromic materials. Electrochromic materials can be organic or inorganic, and reversibly change color when oxidized or reduced in response to an applied electrical potential. Electrochromic devices are therefore constructed so as to modulate incident electromagnetic radiation via transmission, absorption, or reflection of the light upon the application of an electric field across the electrodes. The electrodes and electrochromic materials used in the devices are dependent on the type of device, i.e., absorptive/transmissive or absorptive/reflective.

Absorptive/transmissive electrochromic devices typically operate by reversibly switching the electrochromic materials between colored and bleached (colorless) states. Typical electrochromic materials used in these devices include indium-doped tin oxide (ITO), fluorine-doped tin oxide ($SnO_2$:F), poly(3,4-ethylenedioxythiophene):poly(styrene sulfonate) (PEDOT-PSS), and single-walled carbon nanotubes (SWNT). Flexible electrochromic devices of this type have been constructed using a flexible substrate layer of polyethylene terephthalate (PET), a transparent layer of ITO as the working electrode, and a third layer of PEDOT-PSS as the counter electrode. Drawbacks with ITO include high cost and lower flexibility compared to PEDOT-PSS. PEDOT-PSS, however, suffers from a lower conductivity value compared to ITO. A further drawback of ITO devices for some applications is that in order for light to pass through the device, the electrodes must be transparent.

The absorptive/reflective-type electrochromic devices typically contain a reflective metal as an electrode. The electrochromic polymer is deposited onto this electrode and is faced outward to allow incident light to reflect off the polymer/electrode surface. The counter electrode is behind the active electrode. Similar electrode and electrochromic materials can be used in these reflective devices, in particular ITO and PEDOT-PSS.

Currently known wearable electronic garments are typically made by embedding displays, sensors, or switchers into the fabric or by using metal wires. Such devices resulted in garments that are uncomfortable to wear, difficult to clean, and which cannot be stretched or folded as normal garments.

Traditional electrolytes used to prepare electrochromic devices are either liquid or brittle solids, making them unsuitable for use in a stretchable device or even an electrochromic garment.

There remains a need in the art for electrochromic devices that are stretchable for use in applications requiring both flexibility and stretchability, the devices should also exhibit properties of fast switching and high contrast.

BRIEF SUMMARY OF THE INVENTION

In one embodiment, a stretchable electrochromic device comprises a stretchable conductive substrate; an electrochromic material disposed on or impregnating the stretchable conductive substrate to form a stretchable electrochromic substrate; and a stretchable transparent polymeric electrolyte coating or impregnating the stretchable conductive substrate, the stretchable electrochromic substrate, or a combination thereof; wherein the stretchable transparent polymeric electrolyte comprises a thermoplastic polyurethane, a thermoplastic polyurea, a polyethylene oxide, a crosslinked polyethylene oxide, or a combination thereof, and a salt; wherein the thermoplastic polyurethane and thermoplastic polyurea are not chemically crosslinked; and wherein the thermoplastic polyurethane is prepared from a thermoplastic polyurethane prepolymer, and the thermoplastic polyurea is prepared from a thermoplastic polyurea prepolymer.

In another embodiment, a method of forming a stretchable electrochromic device comprises:

a. disposing an electrochromic material on a surface of a stretchable conductive substrate to form an electrochromic substrate, or b. impregnating a stretchable conductive substrate with an electrochromic material to form an electrochromic substrate; and i. disposing a stretchable polymeric electrolyte premix on the electrochromic substrate to form a stretchable electrochromic device, or ii. impregnating an electrochromic substrate with a stretchable polymeric electrolyte premix to form a stretchable electrochromic device.

In yet another embodiment, a stretchable electrochromic device comprises at least two electrodes, a stretchable polymeric electrolyte disposed between the electrodes, and a potential source in electrical connection with the at least two electrodes, wherein at least one of the electrodes comprises one or more stretchable electrochromic fibers or fabrics.

In yet another embodiment, a device comprises a stretchable transparent polymeric electrolyte comprising a salt and a thermoplastic polyurethane, a thermoplastic polyurea, a polyethylene oxide, a crosslinked polyethylene oxide or a combination thereof; wherein the device is a photovoltaic or a battery.

BRIEF DESCRIPTION OF THE DRAWINGS

The components in the drawings are not necessarily to scale, emphasis instead being placed upon clearly illustrating the principles of the embodiments described herein. Moreover, in the drawings, like reference numerals designate corresponding parts throughout the several views.

DETAILED DESCRIPTION OF THE INVENTION

Disclosed herein are stretchable electrolytes for use in stretchable electrochromic applications, such as stretchable electrochromic devices and stretchable electrochromic fabric applications. The electrochromic device or fabric is able to change color in an unstretched state upon application of and removal of charge. The device or fabric can be stretched and then change color upon application of and removal of charge. This process can be repeated without a loss of the device or fabric's ability to change color. To support the redox process of the stretchable electrochromic device/fabric, a stretchable electrolyte is employed. The stretchable electrolyte is capable of functioning normally under stress conditions and supports the redox process. Using a flexible and stretchable electrolyte, the entire device/fabric can stretch allowing for the ability to prepare wearable electronic garments or for other uses where the electrochromic device is to be flexed, stretched, and bended in its normal use. The stretchable polymeric electrolyte exhibits certain mechanical properties, e.g. elasticity, as well as a certain ionic conductivity, even upon stretching.

Disclosed herein are conductive, stretchable fibers and fabrics, further comprising an electrochromic material, and coupled with a stretchable and transparent electrolyte to result in a stretchable electrochromic fiber or fabric. The stretchable electrochromic fiber or fabric is both flexible and expandable owing to the stretchable electrolyte.

Stretchability for a given material can be characterized by elongation at break and the ability of elastic recovery. Elastomeric material such as spandex, have a large elongation at break value (up to about 800% to about 900%) and recover to their original form when the force is removed within a certain range. Different fabrics have different stretchability depending on the type, fiber/yarn diameter, fiber bundle, etc. In general, common fabrics, such as silk or cotton, have little to no stretchability as compared to spandex. However, there are many commercially available products which contain small amount of spandex (about 5%) that have sufficient stretchability for use as stretchable substrates herein.

Stretchable Transparent Electrolyte

The stretchable electrolyte is a stretchable polymeric electrolyte generally comprising a stretchable polymeric material and a salt to provide ionic conductivity. The stretchable polymeric electrolyte is transparent and elastic, and is capable of being stretched, flexed and bended. Specifically the stretchable polymeric electrolyte has an elongation at break of greater than about 10%, specifically greater than about 20%, still more specifically greater than about 100%, and yet still more specifically greater than about 200%.

The salt used to prepare the stretchable polymeric electrolyte can be an ionic liquid salt. Ionic liquids are a group of salts with such low melting points that they remain in the molten state at room temperature. Ionic liquids typically used in polymer electrolytes have nitrogen-containing organic cations and bulky inorganic anions. The properties which make ionic liquids useful for electrolytes include very low vapor pressure (less evaporation as solvent and higher stability), non-flammable (more thermally stable), wide electrochemical window (wide range for electrochromic device to perform), and high ionic conductivity (most essential property needed for electrolytes). Ionic salts can comprise an anion (e.g. halide, tetrafluoroborate, hexafluorophosphate, bistriflimide (aka bistrifluoromethanesulfonimide), triflate, tosylate, formate, alkylsulfate, alkylphosphate, glycolate, and the like); and a bulky organic cation (e.g., 1-alkyl-3-methylimidazolium, 1-alkylpyridinium, N-methyl-N-alkylpyrrolidinium, and the like). Exemplary ionic liquids for use in the polymeric electrolyte include 1-butyl-3-methylimidazolium hexafluorophosphate ((BMIM)$PF_6$), 1-ethyl-3-methylimidazolium hexafluorophosphate, pyridinium chloride ($C_5H_6Cl$) and other ionic liquids with similar structures.

Other suitable salts for use in the polymeric electrolyte include an alkali metal ion salt of Li, Na, or K. Exemplary salts, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($2 \leq n \leq 3$), $MN(RfOSO_2)_2$ (wherein Rf is a fluoroalkyl group), MOH, or a combination thereof.

The stretchable polymeric material for the stretchable polymeric electrolyte is generally a thermoplastic polyurethane, thermoplastic polyurea, a polyethylene oxide, a crosslinked polyethylene oxide, or a combination thereof. The thermoplastic polyurethane/urea used as the polymeric electrolyte is not chemically crosslinked. The thermoplastic polyurethane/urea typically has a large elongation to break (about 400% to about 800%), and returns quickly and almost completely to the original length after release of deformation stress in certain ranges.

In one embodiment, the stretchable polymeric electrolyte is prepared from a stretchable polymeric electrolyte premix comprising a thermoplastic polyurethane prepolymer, a thermoplastic polyurea prepolymer, or a combination thereof; a curative, a salt, and an organic solvent. In other embodiments, the stretchable polymeric electrolyte is prepared directly from monomers.

In another embodiment, the stretchable polymeric electrolyte is prepared from a polyethylene oxide or a crosslinkable polyethylene oxide.

The salt for use in the stretchable polymeric electrolyte premix can be one or more of the salts described above for use in the stretchable polymeric electrolyte.

The solvent used to prepare the polymeric electrolyte premix is generally any organic solvent which can dissolve the thermoplastic polyurethane/polyurea prepolymer and salt. Because the components of premix, have either a very small domain size or are completely solubilized in a single phase they are optically transparent in the visible wavelength range. Exemplary solvents include high boiling, polar organic solvents and halogenated organic solvents such as N,N-dimethylformamide (DMF), dimethylacetamide, toluene, xylene, tetraglyme, low molecular weight (MW<800) liquid polyethylene oxides, and the like, or combinations thereof.

The thermoplastic polyurethane prepolymer is generally prepared from the reaction between at least one macropolyol, specifically a macrodiol, and at least one polyisocyanate, specifically a diisocyanate. The thermoplastic polyurea prepolymer is generally prepared from the reaction between at least one macropolyamine, specifically a macrodiamine, and at least one polyisocyanate, specifically a diisocyanate. Various combinations of macropolyol, macropolyamine, and polyisocyanate can be made which will impart the prepolymer, and thus the resulting polymer, with different properties.

A generalized formulation for the polyurethane/urea prepolymer endcapped with a group ("E") having an isocyanate group is according to formula (I):

wherein G is an aliphatic or aromatic group having up to about 30 carbons, specifically a cyclic aliphatic or aromatic group; each instance of X is independently O or NH; L is a polyether or polyester. The percentage of the NCO functional group of the prepolymer can be about 0.5 to about 6%, specifically about 2 to about 4.5, and more specifically about 3 to about 3.5%.

The polyisocyanate for use to prepare the thermoplastic polyurethane/urea or thermoplastic polyurethane/urea prepolymer can include aliphatic or aromatic polyisocyanates having up to 30 carbons and at least 2 isocyanate groups, specifically 2 isocyanate groups.

The aromatic polyisocyanate can have up to about 30 carbons and 2, 3, 4 or more isocyanate groups. In one embodiment, the aromatic polyisocyanate is according to formula (II)

wherein q is 0 or 1; each instance of m is independently 1 or 2, and Q is a bond, $C_1$-$C_6$ alkyl, $C_1$-$C_6$ haloalkyl, $C_1$-$C_3$ alkyl-O—$C_1$-$C_3$ alkyl, $C_1$-$C_3$ alkyl-S—$C_1$-$C_3$ alkyl, $C_1$-$C_3$ alkyl-S(=O)—$C_1$-$C_3$ alkyl, $C_1$-$C_3$ alkyl-S(=O)$_2$—$C_1$-$C_3$ alkyl, O, S, S(=O), S(=O)$_2$, or C(=O); specifically $C_1$-$C_3$ alkyl, C(CH$_3$)$_2$, CH$_2$, CH$_2$CH$_2$, O, C(CF$_3$)$_2$, CH$_2$OCH$_2$, S(=O), S(=O)$_2$, C(=O), CH$_2$S(=O)CH$_2$, or CH$_2$S(=O)$_2$CH$_2$.

Exemplary aromatic diisocyanates include phenylene diisocyanate including isomer mixtures or single isomers; 4,4'-diphenylmethane diisocyanate; 2,4'-diphenylmethane diisocyanate; 2,2'-diphenylmethane diisocyanate; toluoylene diisocyanate including isomer mixtures or single isomers; 2,4-toluoylene diisocyanate; 2,6-toluylene diisocyanate; xylylene diisocyanate; 1,5-naphthylene diisocyanate; and 3,3'-dichloro-4,4'-diphenylmethane diisocyanate; and the like. In one embodiment, the diisocyanate is 4,4'-diphenylmethane diisocyanate ("MDI").

The aliphatic or alicyclic polyisocyanate can have up to about 30 carbons and 2, 3, 4 or more isocyanate groups. Exemplary aliphatic or alicyclic diisocyanates include hexamethylene diisocyanate, isophorone diisocyanate, 4,4'-dicyclohexylmethane diisocyanate and hydrogenated xylylene diisocyanate; and the like. One or more of the aromatic, aliphatic, and alicyclic polyisocyanates can be used to prepare the prepolymer or polymer.

As long as the stretchability of the ultimate polyurethane/polyurea is not unduly affected, small amounts of tri-functional or higher poly-functional polyisocyanates, such as triphenylmethane triisocyanate, can be included with the diisocyanate.

The macropolyol used to prepare the thermoplastic polyurethane prepolymer by reaction with the polyisocyanate can include a compound having hydroxyl number of about 30 to about 350, which is capable of reacting with an isocyanate group.

The macropolyol or macropolyamine used to prepare the thermoplastic polyurethane/urea prepolymer by reaction with the polyisocyanate can include a compound having a number average molecular weight of about 300 to about 2500, specifically about 500 to about 2000, and more specifically about 750 to about 1500. Suitable macropolyol and macropolyamine include macroglycols, polyether diols, polyester diols, polyether diamines, and polyester diamines, and the like, or combinations thereof.

In the reaction to prepare the prepolymer, the ratio of macrodiol to diisocyanate is generally about 1:1; and the ratio of macrodiamine to diisocyanate is generally about 1:1.

A catalyst may be employed to promote the reaction between the polyisocyanate and the macropolyol, macropolyamine, or both Exemplary suitable catalysts include bismuth catalyst; zinc octoate; tin catalysts, such as di-butyltin dilaurate, di-butyltin diacetate, tin(II) chloride, tin(IV) chloride, di-butyltin dimethoxide, dimethyl-bis[(1-oxonedecyl)oxy]stannane, di-n-octyltin bis-isooctyl mercaptoacetate; amine catalysts, such as triethylenediamine, triethylamine, and tributylamine; organic amine catalysts, or a combination thereof. The catalyst is added in an amount sufficient to catalyze the reaction of the components in the reactive mixture. In one embodiment, the catalyst is present in an amount of from 0.001 wt % to 5 wt %, based on the total weight of the starting material.

An exemplary polyurethane prepolymer is Duracast™ E900 commercially available from Chemtura.

The thermoplastic polyurethane prepolymer, thermoplastic polyurea prepolymer, or both are combined with a chain extender ("curative" e.g. a diol or a diamine) to allow for a chain extension reaction to form the thermoplastic polyurethane or thermoplastic polyurea.

The chain extender used in combination with the thermoplastic polyurethane/urea prepolymer to prepare the thermoplastic polyurethane/urea can include a compound having a number average molecular weight of not more than 300 and having two or more active hydrogen atoms capable of reacting with an isocyanate group. Suitable compounds include diols such as ethylene glycol, propylene glycol, 1,4-butanediol, 1,6-hexanediol, 1,4-bis(β-hydroxyethoxy)benzene, 1,4-cyclohexanedimethanol, 3-methyl-1,5-pentanediol, bis(β-hydroxyethyl) terephthalate, xylylene glycol; diamines such as hydrazine, ethylenediamine, propylenediamine, isophoronediamine, piperazine, piperazine derivatives, phenylenediamine, toluoylenediamine, xylylenediamine, adipic acid dihydrazide and isophthalic acid dihydrazide; aminoalcohols such as aminoethyl alcohol and aminopropyl alcohol; and the like; or combinations thereof. A specific diol includes an aliphatic diol having 2 to 10 carbon atoms.

An exemplary chain extension curative is Duracure™ C3 commercially available from Chemtura.

Polymeric electrolytes with different stretching ability and conductivity could be achieved by varying the polyurethane/urea prepolymer composition, and varying the salt used.

In an exemplary process to prepare the stretchable polymeric electrolyte for application onto a substrate, a polymeric electrolyte premix containing a polyurethane prepolymer, a polyurea prepolymer, or a combination thereof; and a curative such as a diol or diamine for chain extension reaction is dissolved in a solvent (discussed above). The resulting mixture is combined with a salt, such as an ionic liquid to form the polymeric electrolyte premix.

The polymeric electrolyte premix can be applied to a substrate, specifically a stretchable, porous substrate, to coat, imbibe, or impregnate the substrate. The polymeric electrolyte premix can be applied using coating processes known in the art, such as drop casting, dip coating, spray coating, ink jet coating, electrostatic spinning, gravure coating methods, extrusion coating, stamping, screen printing, rotary press, and similar printing techniques, and the like. The solvent is then allowed to evaporate and the prepolymer is chain extended via the curative to form a transparent, flexible and stretchable polymeric electrolyte which coats, impregnates, or coats and impregnates the substrate.

Stretchable Substrate

The stretchable substrate that can be used with the stretchable polymeric electrolyte includes stretchable fibers, such as spandex fibers; stretchable fabric such as spandex fabric or fabric prepared from blends of spandex and other materials; stretchable nonfabric, porous substrates (e.g. foamed thermoplastic polyurethane). Exemplary stretchable substrates include two way or four way stretchable fabrics such as spandex.

In specific embodiments, the stretchable substrate is a stretchable electrochromic substrate. The stretchable electrochromic substrate can be a stretchable electrochromic fiber or fabric prepared from electrochromic materials; stretchable fiber or fabric prepared from non-electrochromic materials which have been coated or impregnated with an electrochromic material; or a combination thereof.

Exemplary stretchable, electrochromic substrates include those described in copending U.S. Published Application No. 2010-0245971A1 to Sotzing et al., the relevant portions of which are hereby incorporated by reference.

The term "fiber" as used herein includes single filament and multi-filament fibers, i.e., fibers spun, woven, knitted, crocheted, knotted, pressed, plied, or the like from multiple filaments. No particular restriction is placed on the length of the fiber, other than practical considerations based on manufacturing considerations and intended use. Similarly, no particular restriction is placed on the width (cross-sectional diameter) of the fibers, other than those based on manufacturing and use considerations. The width of the fiber can be essentially constant, or vary along its length. For many purposes, the fibers can have a largest cross-sectional diameter of 2 nanometers and larger, for example up to 2 centimeters, specifically from 5 nanometers to 1 centimeter. In an embodiment, the fibers can have a largest cross-sectional diameter of 5 to 500 micrometers, more particularly, 5 to 200 micrometers, 5 to 100 micrometers, 10 to 100 micrometers, 20 to 80 micrometers, or 40 to 50 micrometers. In one embodiment, the fiber has a largest circular diameter of 40 to 45 micrometers. Further, no restriction is placed on the cross-sectional shape of the fiber, providing the desirable properties such as electrochromic behavior, flexibility, and/or stretchability are not adversely affected. For example, the fiber can have a cross-sectional shape of a circle, ellipse, square, rectangle, or irregular shape.

The electrically conductive fibers (which as used herein include non-electrically conductive fibers rendered electrically conductive) are coated with an electrochromic material as described in further detail below to provide an electrically conductive, electrochromic fiber. The thickness of the electrically conductive and electrochromic layer will depend on factors such as the type of fiber, the type of electrolyte, the type of electrically conductive and electrochromic material, the device configuration, performance requirements, and like considerations, and can be readily determined by one of ordinary skill in the art without undue experimentation using the guidance herein. In one embodiment, the electrically conductive and electrochromic layer has a thickness of 0.1 to 10 micrometers, more specifically 0.1 to 6 micrometers, and even more specifically 3 to 6 micrometers.

The electrically conductive, electrochromic fiber can be used in the form of a single fiber, a yarn, or a fabric. A "yarn" as used herein is a multi-fiber thread formed from two or more of the electrically conductive, electrochromic fibers by a variety of means, including but not limited to spinning, braiding, knitting, crocheting, knotting, pressing, and plying. For convenience in later discussion, the term "electrochromic fiber" is used to refer to the electrically conductive, electrochromic fibers and yarns. It is to be understood that this term encompasses electrically conductive fibers coated with an electrochromic material; non-electrically conductive fibers that have been rendered electrically conductive and coated with an electrochromic material; and yarns comprising one or more of the foregoing types of fibers. Electrically conductive, electrochromic yarns can be used in place of or in addition to the electrically conductive, electrochromic fibers. Further, the electrochromic fibers can be used in the manufacture of a fabric. The fabric can be woven (e.g., a mesh, twill, satin, basket, leno or mock leno weave) or nonwoven (e.g., a felt, wherein the fibers are entangled).

Electrically conductive fibers formed from non-conductive fibers that have been rendered electrically conductive can also be used. In one embodiment, a nonconductive fiber is coated with a layer of a conductive material. Exemplary stretchable nonconductive fibers include those known for use in the manufacture of fabrics, including polyurethane (spandex), and blends of polyurethane (spandex) and an additional synthetic organic polymers (e.g., poly(amide) (nylon), poly(ethylene), poly(ester), poly(acrylic), poly(lactide), and the like) or natural materials (e.g., cotton, silk, and wool). Specific fibers include spandex fiber.

In another embodiment, fabrics prepared from a combination of stretchable fibers (e.g., polyurethane (spandex)) and other fibers (e.g. synthetic organic polymers or natural materials) can be used as long as the overall fabric is stretchable.

The nonconductive fiber can be coated with a conductive material (e.g. conductive polymer or conductive polymer precursor discussed herein) to render the fiber conductive. The coated fibers can be used as a fiber, or at least two coated fibers can be woven, knitted, crocheted, knotted, pressed, or plied to form a multi-filament fiber. It is also possible to have multiple nonconductive fibers formed into a yarn, and then coated with a conductive material. This construction can be used as a fiber, or be woven, knitted, crocheted, knotted, pressed, or plied to form a multi-filament fiber.

In one embodiment, any of the exemplary non-conductive fibers disclosed herein can be coated with an electrically conductive polymer, for example conjugated polymers such as poly(thiophene), poly(pyrrole), poly(aniline), poly(acetylene), poly(p-phenylenevinylene) (PPV), PEDOT-PSS, and the like. In a specific embodiment, a flexible, elastic fiber is coated with an electrically conductive material such as PEDOT-PSS, sulfonated polythieno[3,4-b]thiophene polystyrenesulfonate, the various poly(aniline)s (e.g., those sold by Enthone under the trade name ORMECON), and the like; or an electrically conductive polymer precursor. In a specific embodiment, a nylon or spandex fiber is coated with PEDOT-PSS.

In a similar embodiment, a fabric made from any of the exemplary non-conductive fibers can be coated or impregnated with an electrically conductive polymer or electrically conductive polymer precursor.

Reviews on the various categories of electrochromic polymers have been published. (See for example, N. Rowley and R. Mortimer, "New Electrochromic Materials", Science Progress (2002), 85 (3), 243-262 and "Electrochromic Materials", in Proceedings of the Electrochemical Society, K. Ho, C. Greenberg, D. MacArthur, eds., Volume 96-23, 1997 among others). Electrochromic organic polymers are particularly useful, and have been described, for example, in the "Handbook of Conducting Polymers," 3$^{rd}$ Ed. By Skotheim and Reynolds, Chs. 1-5, 9, 10, 11, 20. Desirable properties for the electrochromic polymer include a high degree of transparency in the visible color region in the "off" state (non-reduced or non-oxidized states, high absorption in visible spectral region upon electroreduction or electrooxidation ("on" state) (or in the case of multi-colored polymers, a high contrast between colored states), low electrochemical potential for reduction/oxidation, high stability in the "on" or "off" state (bi-stable), strong adsorption to the conductive fiber, color tunability by synthetic variation of the electrochromic precursor, low solubility of the electrochromic materials in common solvents, and low toxicity. Desirable electrochromic materials are those that undergo the highest contrast change upon oxidation or reduction, that is, from a colorless to a highly colored state, from a colored state to a colorless one, or from one colored state to another colored state upon oxidation and reduction.

The electrochromic layer can be formed by direct coating of the electrochromic material, or by methods such as electrochemical deposition or in situ polymerization. In one embodiment the electrochromic material is a polymer formed by chemical or electrochemical oxidative polymerization of an electrochromic polymer precursor comprising a functional group selected from pyrrole (1-aza-2,4-cyclopentadiene), thiophene, aniline, furan, carbazole, azulene, indole, bipyridine, diazapyrene, perylene, naphthalene, phenothiazine, triarylamine, substituted phenylendiamine, benzothiadiazole, ferrocene, and the derivatives of the foregoing compounds. The chemical or electrochemical polymerization of precursors can be performed after disposing the electrochromic precursor onto the conductive fiber or the conductive fabric. Alternatively, the electrochromic material can be formed by solution electrochemical polymerization of a dissolved electrochromic precursor, resulting in deposition of insoluble electrochromic material on a surface of the substrate.

The electrochromic precursor can be monomeric (in the case of electrodeposition) or polymeric, and can be selected from cathodically coloring materials, anodically coloring materials, or a combination thereof. In particular, the electrochromic precursor is a polymer or oligomer that can undergo further chain growth and/or crosslinking to produce the electrochromic material adheringly disposed on a substrate. "Polymerizing" includes chain growth reactions and/or crosslinking reactions to form the electrochromic material from an electrochromic precursor.

Cathodically coloring materials have a band gap ($E_g$) less than or equal to 2.0 eV in the neutral state. A cathodically coloring material changes color when oxidized (p-doped). The change in visible color can be from colored in the neutral state to colorless in the oxidized state, or from one color in the neutral state to a different color in the oxidized state. Cathodically coloring materials include, but are not limited to, polymers derived from a 3,4-alkylenedioxyheterocycle such as an alkylenedioxypyrrole, alkylenedioxythiophene or alkylenedioxyfuran. These further include poly(3,4-alkylenedioxyheterocycle)s comprising a bridge-alkyl substituted poly(3,4-alkylenedioxythiophene), such as poly(3,4-(2,2-dimethylpropylene)dioxythiophene) (PPropOT-(Me)$_2$, poly (3,4-(2,2-dihexylpropylene)dioxythiophene) PPropOT-(hexyl)$_2$, or poly(3,4-(2,2-bis(2-ethylhexyl)propylene) dioxythiophene) PPropOT-(ethylhexyl)$_2$. Herein, "colored" means the material absorbs one or more radiation wavelengths in the visible region (400 nm to 700 nm) in sufficient quantity that the reflected or transmitted visible light by the material is visually detectable to the human eye as a color (red, green, blue or a combination thereof).

An anodically coloring material has a band gap $E_g$ greater than 3.0 eV in its neutral state. An anodically coloring material changes color when reduced (n-doped). The material can be colored in the neutral state and colorless in reduced state, or have one color in the neutral state and a different color in the reduced state. An anodically coloring material can also comprise a poly(3,4-alkylenedioxyheterocycle) derived from an alkylenedioxyheterocycle such as alkylenedioxypyrrole, alkylenedioxythiophene or alkylenedioxyfuran. Exemplary anodically coloring poly(3,4-alkylenedioxyheterocycle)s comprise an N-alkyl substituted poly(3,4-alkylenedioxypyrrole), such as poly(N-propyl-3,4-propylenedioxypyrrole) N—Pr PPropOP, poly(N-Gly-3,4-propylenedioxypyrrole) N-Gly PPropOP, where N-Gly designates a glycinamide adduct of pyrrole group, or N-propane sulfonated PPropOP (PPropOP-NPrS).

Electrochromic polymers also include, for example, poly (3,4-ethylenedioxythiophene) (PEDOT), poly(3,4-propylenedioxythiophene) (PPropOT), poly(1,4-bis[(3,4-ethylenedioxy)thien-2-yl]benzene) P(BEDOT-B), and poly(2,5-bis[(3,4-ethylenedioxy)thien-2-yl]-thiophene) P(BEDOT-T).

Specific electrochromic precursors include those of formula (III):

(III)

wherein $X^1$ is NH, S, O, or N-G' wherein $G^1$ is a straight, branched chain, or cyclic, saturated, unsaturated, or aromatic group having from 1 to 20 carbon atoms and optionally 1 to 3 heteroatoms selected from S, O, Si, and N, and optionally substituted with carboxyl, amino, phosphoryl, sulfonate, halogen, or straight, branched chain, or cyclic, saturated, unsaturated, or aromatic group having from 1 to 6 carbon atoms and optionally 1 to 3 heteroatoms selected from S, O, Si, and N (for example phenyl, substituted phenyl, or propyl sulfonate); R is H, an O-alkyl group comprising 1 to 20 carbons, or an alkyl group comprising 1 to 20 carbons.

Other electrochromic precursors include those of formula (IV):

(IV)

wherein $X^1$ and R have been previously defined above.

Other electrochromic precursors include those of formula (V):

(V)

wherein $X^1$ is as previously defined, each instance of $R^2$ is independently H, an O-alkyl group comprising from 1 to 20 carbons, or an alkyl group comprising from 1 to 20 carbons, p is an integer from 1 to 20, and m is an integer from 1 to 100.

Other electrochromic precursors include those of formula (VI):

(VI)

wherein each instance of $X^1$ independently is as previously defined, each instance of $R^2$ independently is as previously defined, and p is an integer from 1 to 20.

Other electrochromic precursors include those of formula (VII):

(VII)

$R^2$ is as previously defined.

Other electrochromic precursors include those of formula (VIII):

(VIII)

wherein each instance of $R^2$ independently is as previously defined.

Other electrochromic polymer precursors have the general formulas (IX) and (X):

wherein r is an integer greater than 0; y is an integer from 0 to 2; $Z^1$ and $Z^2$ are independently —O—, —NH—, or —S—; $X^2$ is an alkylene group comprising 1 to 20 carbons; Q is a silylene group, for example —Si($R^4$)$_2$— or —Si($R^4$)$_2$—O—Si($R^4$)$_2$—, wherein $R^4$ is an alkyl group comprising 1 to 20 carbons, for example methyl, ethyl, propyl, isopropyl, n-butyl, n-pentyl, n-hexyl, n-heptyl, or n-octyl; and $R^3$ is an alkyl or aryl group comprising 1 to 20 carbons attached at the 3 and/or 4 position (shown) of the five-membered ring containing $Z^2$. Exemplary $R^3$ include methyl, ethyl, propyl, isopropyl, n-butyl, n-pentyl, n-hexyl, n-heptyl, n-octyl, phenyl, n-butylthio, n-octylthio, phenylthio, and methoxyphenyl.

In one embodiment, r is an integer from 1 to 1000, y is 0, $X^2$ is ethylene (—CH$_2$CH$_2$—), $Z^1$ and $Z^2$ are both sulfur, Q is —Si($R^4$)$_2$—, and $R^4$ is n-octyl. This 2,5-bis[(3,4-ethylenedioxy)thien-2-yl]-thiophene (BEDOT-T) silylene precursor polymer can be formed by the nickel-catalyzed coupling of 3,4-ethylenedioxythiophene with dibromothiophene, to form BEDOT-T, followed by deprotonation of BEDOT-T using n-BuLi to form a dianion of BEDOT-T, and reacting the dianion with dichlorodioctylsilane to form the BEDOT-T silylene precursor polymer. The weight average molecular weight of the BEDOT-T silylene precursor polymer can be 1000 to 100,000 g/mole, more specifically 1,000 to 10,000 g/mole.

In another specific embodiment, r is an integer from 1 to 1000, y is 0, $X^2$ is 2,2-dimethylpropylene (—CH$_2$C(CH$_3$)$_2$CH$_2$—), $Z^1$ and $Z^2$ are both sulfur, Q is —Si($R^4$)$_2$O—Si($R^4$)$_2$—, and $R^4$ is methyl. This PropOT-Me$_2$ silylene precursor polymer can be prepared by transesterification of 3,4-dimethoxythiophene with 2,2-dimethyl-1,3-propanediol using para-toluene sulfonic acid (PTSA) or dodecylbenzene sulfonic acid (DBSA) as catalysts in anhydrous toluene to form PropOT-Me$_2$, deprotonating the PropOT-Me$_2$ using 2 equivalents of n-BuLi to form the dilithium dianion, and reacting the dilithium dianion with dichlorotetramethylsiloxane to form the PropOT-Me$_2$ silylene precursor polymer. The weight average molecular weight of the PropOT-Me$_2$ silylene precursor polymer can be 1000 to 100,000 g/mole, more specifically 1,000 to 5000 g/mole.

In addition to the heterocyclic ring systems shown in the precursors of formulas (IX) and (X), other aromatic heterocycle groups, e.g., those of formulas (III)-(VIII), can also be synthesized with silylene of formula Q. Additional electrochromic precursors are described, for example, in U.S. Pat.

No. 7,321,012, U.S. Published Application No. 2007-0089845, WO2007/008978, and WO2007/008977.

A variety of different techniques can be used to apply electrochromic materials or electrochromic polymer precursor mixture, to the stretchable fibers or to the stretchable fabrics, for example spray coating, ink jet coating, dip coating, electrostatic spinning, gravure coating methods, extrusion coating, stamping, screen printing, rotary press, and similar printing techniques can be used. The stretchable fibers and stretchable fabrics can be electrically conductive or non-conductive.

The coating techniques generally comprise forming a mixture of the material to be coated with a solvent, applying the mixture to a surface of a stretchable substrate, (e.g. fiber or fabric), and removing the solvent to form a thin film of the material adheringly disposed on the surface of the substrate, impregnated in the substrate, or a combination thereof. The solvent can be an organic solvent or combination of an organic solvent and water. Exemplary organic solvents include dichloromethane (DCM), toluene, N,N-dimethyl formamide (DMF), propylene glycol monomethyl ether acetate (PGMEA), propylene glycol monomethyl ether (PGME), acetone, methanol, and ethanol.

The mixture can contain the electrochromic polymer precursor at a concentration of 0.01 weight percent (wt. %) to 5 wt. %, based on the total weight of the mixture. More particularly, the mixture can contain the electrochromic polymer precursor at a concentration of from 0.01 wt. % to 1.5 wt. % in a solvent, for example dichloromethane. Specifically, for spray coating trials, a concentration of 2 mg/mL precursor polymer/solvent has been used (0.1 wt. %). In some instances, the material to be coated can be a liquid and can be coated neat. In other instances when a solvent is not used, evaporative coating or powder coating techniques can be employed for disposing a solid material to the surface of the substrate.

Alternatively, in some instances, the electrochromic precursor to be coated is a liquid and can be coated neat. In other instances, when a solvent is not desirable, evaporative coating or powder coating techniques can be used to apply the solid material to the surface of a substrate.

Polymerizing the electrochromic polymer precursor can be accomplished electrochemically (in situ or ex situ), chemically, thermally, or by radiative crosslinking. In particular, the electrochromic precursor is polymerized electrochemically. For example, the fiber or fabric, once coated with the electrochromic polymer precursor, can be converted to an electrochromic electrode in situ (inside an assembled device type) by applying an oxidative potential across the device. The electrochromic polymer precursor irreversibly converts to the electrochromic polymer and can be switched as normal, with a moderate reduction in optical contrast. In another embodiment, the coated electrically conductive fiber or fabric is converted ex situ. The coated electrically conductive fiber or fabric is immersed in a 0.1 M electrolyte solution (typically lithium triflate in acetonitrile, though many other salts and solvents can be used) and the appropriate voltage is applied via a three-electrode cell (using a Pt counter electrode and a calibrated non-aqueous $Ag/Ag^+$ reference electrode) for a given period of time, depending on the desired thickness of the electrochromic precursor layer. In this manner, an insoluble electrochromic layer of material is disposed on the electrically conductive fiber or fabric, which is then ready to be coated with the stretchable polymeric electrolyte to form an electrochromic electrode.

The thickness or amount of the stretchable polymeric electrolyte layer on the stretchable substrate will depend on factors such as the type of electrochromic fiber, the type of electrolyte, the device configuration, performance requirements, and like considerations, and can be readily determined by one of ordinary skill in the art without undue experimentation using the guidance herein. In one embodiment, the stretchable polymeric electrolyte layer has a thickness of 10 to 500 micrometers, more specifically 10 to 200 micrometers, 20 to 150 micrometers, or 50 to 100 micrometers.

Devices such as spandex fiber or fabric coated or impregnated with a conducting polymer and coated or impregnated with the transparent, stretchable polymeric electrolyte are able to switch between two color states before, during, and after stretching of the device.

In one embodiment, a method of forming a stretchable electrochromic fiber or fabric comprises disposing an electrically conductive, electrochromic material onto a non-electrically conductive, stretchable fiber or fabric to form a coated fiber or fabric. The method further comprises disposing a stretchable polymeric electrolyte premix on the coated fiber or fabric to form a stretchable, electrochromic fiber or fabric. A stretchable, electrochromic fabric can be formed from a plurality of the stretchable, electrochromic fibers by weaving or entangling the plurality.

In a specific embodiment, disposing the electrochromic material comprises disposing a monomeric electrochromic precursor, and polymerizing the electrochromic precursor to form a polymeric electrochromic layer on the surface of the non-electrically conductive, stretchable fiber or fabric.

Articles comprising the stretchable electrochromic fibers, fabrics, and devices which comprise a stretchable polymeric electrolyte include garments. The electrochromic device can be the entire garment or a portion of the garment. The electrochromic device can further be an integral part of the garment or a detachable portion of the garment.

The electrochromic devices can be operated in a reflective mode, and therefore do not require a transparent electrode or transparent conductive substrate. The devices also exhibit good switching times, reversibly changing color in response to an applied electrical potential in less than one second. The color change can differ depending on the polarity of the applied field.

In one embodiment, an electrode in an electrochromic device comprises a stretchable electrochromic substrate coated with a stretchable polymeric electrolyte as disclosed herein. The stretchable electrochromic substrate can be prepared from a non-conductive material (e.g. spandex) and an electrically conductive and electrochromic layer (e.g. PEDOT-PSS).

Electrochromic devices can be prepared comprising one or more of the electrochromic fiber electrodes. Each fiber electrode can be independently electronically addressable and each can display the same or a different visible color in response to an applied electrical potential.

Figure 1:
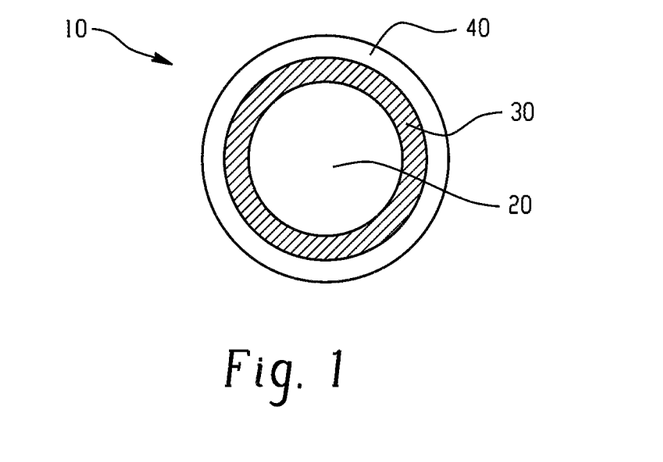
FIG. 1 is a schematic cross-sectional view of an exemplary electrochromic fiber electrode.

FIG. 1 is a schematic cross-sectional view of a stretchable electrochromic fiber electrode 10 comprising a stretchable non-conductive fiber 20, e.g., spandex fiber, an electrochromic layer 30 comprising an electrochromic, conductive material, e.g. PEDOT-PSS, disposed on the non-conductive fiber 20, and an electrolyte layer 40 comprising stretchable polymeric electrolyte disposed on the electrochromic layer 30. While fiber 20 is shown as a unitary core, any configuration of an electrically conductive fiber can be used. The thickness of the electrochromic layer 30 and electrolyte later 40 will depend on factors such as the type of fiber, the type of electrolyte, the type of electrochromic material, the device configuration, performance requirements, and like considerations, and can be readily determined by one of ordinary skill in the art without undue experimentation using the guidance herein. In one embodiment, the electrochromic layer 30 has a thickness of about 0.1 to about 10 micrometers, more specifically about 0.1 to about 6 micrometers, and even more specifically about 3 to about 6 micrometers. In another embodiment, the electrolyte layer 40 has a thickness of about 10 to about 500 micrometers, specifically about 15 to about 200 micrometers, more specifically about 20 to about 150 micrometers, and even more specifically about 50 to about 100 micrometers.

Figure 2:
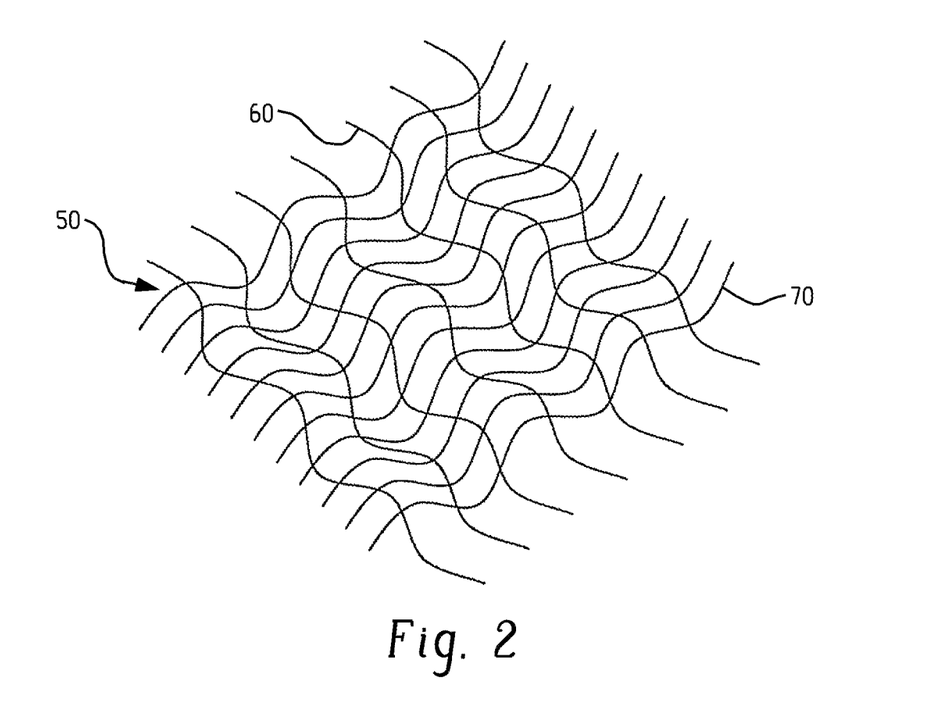
FIG. 2 is a schematic cross-sectional view of an exemplary electrochromic fabric in the form of a woven sheet, and comprising an electrochromic fiber electrode.

Electrochromic devices comprising one or more of the electrochromic fiber electrodes are disclosed herein. FIG. 2 is a schematic perspective view of an exemplary fabric 50 in the form of a woven sheet, comprising a first electrochromic fiber electrode 60 as described above and a second fiber electrode 70. In one embodiment, second fiber electrode 70 is also an electrochromic fiber electrode as described above. In another embodiment, second fiber electrode 70 is a fiber electrode that is not electrochromic.

The first electrochromic fiber electrode 60 and the second fiber electrode 70 can be independently electronically addressable. When both the first electrochromic fiber electrode 60 and the second fiber electrode 70 are each electrochromic, each can display the same or a different visible color in response to an applied electrical potential.

While the first electrochromic fiber electrode 60 and the second fiber electrode 70 are shown in a perpendicular woven relationship in FIG. 2, it is also possible for each of the fiber electrodes 60 and 70 to be cowoven or entangled in a non-perpendicular relationship, provided that a portion of each of the electrochromic fiber electrodes are in contact. Further, the unlabeled fiber electrodes making up the woven pattern can each independently be electrochromic fiber electrodes or non-electrochromic fiber electrodes. While a woven fabric is illustrated in FIG. 2, nonwoven fabric electrodes comprising one or more electrochromic fiber electrodes are also within the scope of this disclosure. In one embodiment, a plurality of electrochromic, electrically conductive fibers are present in the woven or nonwoven fabric. In another embodiment, the majority (greater than 50%) of the fibers present in the woven or nonwoven fabric are electrochromic, more specifically greater than 75%, and even more specifically greater than 90% of the fibers present in the woven or nonwoven fabric electrode are electrochromic. Alternatively, all of the electrode fibers in the woven or nonwoven fabric can be electrochromic.

Figure 3:
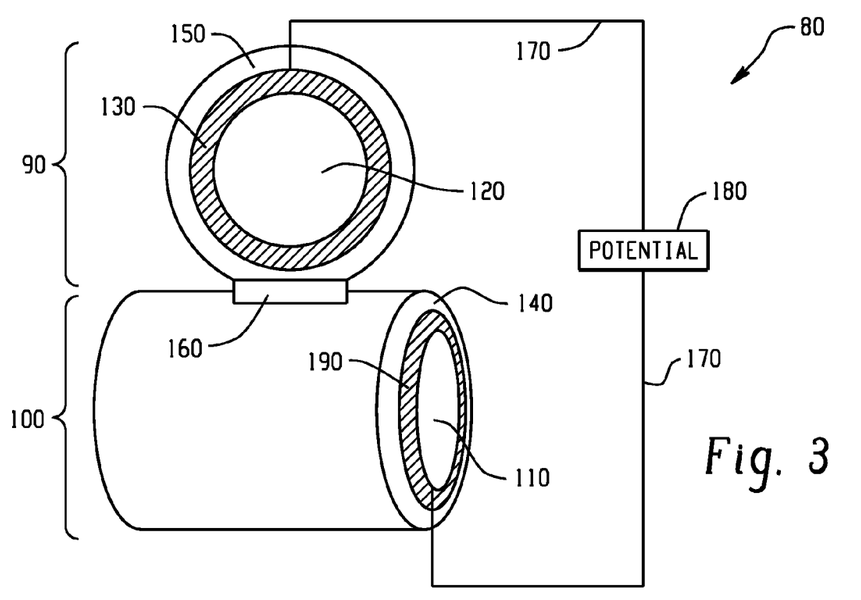
FIG. 3 is a magnified, schematic cross-sectional view of an exemplary electrochromic device comprising the electrochromic fabric of FIG. 2.

FIG. 3 is a magnified schematic cross-sectional view of an exemplary electrochromic device 80 comprising a woven fabric as shown in FIG. 2 wherein the fiber electrodes 90 and 100 are independently addressable. The woven fabric comprises a first electrochromic fiber electrode 90 woven in a first direction, the first fiber electrode comprising a first nonelectrically conductive fiber 120, a first electrochromic, conductive layer 130 comprising a first electrochromic, conductive polymer disposed on the first nonelectrically conductive fiber 120, and a first electrolyte layer 150 comprising a first stretchable polymeric electrolyte disposed on the first electrochromic, conductive layer 130. A second fiber electrode 100 is woven in another direction (i.e., perpendicular as shown in FIG. 2). Second fiber electrode 100 can comprise second nonelectrically conductive fiber 110, a second electrochromic, conductive layer 190 comprising a second electrochromic, conductive polymer disposed on second nonelectrically conductive fiber 110 (e.g., spandex fiber), and a second electrolyte layer 140 comprising a second stretchable polymeric electrolyte disposed on second electrochromic, conductive layer 190. While a woven fabric having the fibers in perpendicular relationship is shown, the fibers can be oriented in any direction relative to each other.

Conductive circuit 170 connects first electrochromic fiber electrode 90 and second fiber electrode 100 to electrical potential generator 180. Joint 160 provides a conductive interface between first and second fiber electrodes 90 and 100. Joint 160 can be formed by thermally treating the fabric at a temperature sufficient to fuse the first and second polymeric electrolyte layers 140 and 150 at an intersection point of the first electrochromic fiber electrode 90 and the second fiber electrode 100, thus forming a continuous conductive path from one fiber electrode to the other.

Figure 4:
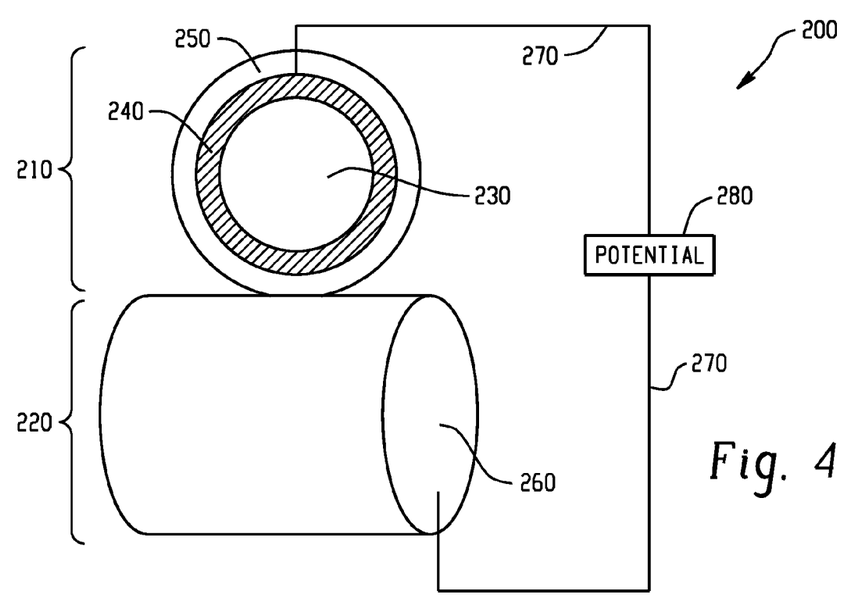
FIG. 4 is a magnified, schematic cross-sectional view of another exemplary electrochromic device comprising the electrochromic fabric of FIG. 2.

In an alternative embodiment to the electrochromic device 80 of FIG. 3, FIG. 4 is a magnified schematic cross-sectional view of an electrochromic device 200 comprising a first electrochromic fiber electrode 210 and a second fiber electrode 220, which is an electrically conductive, non-electrochromic electrode. Unlike the second fiber electrode 100 of FIG. 3, the second fiber electrode 220 does not comprise an electrochromic layer or an electrolyte layer disposed on the electrically conductive fiber. The electrochromic device 200 comprises the first electrochromic fiber electrode 210 woven in a first direction, the first fiber electrode comprising a first nonelectrically conductive fiber 230, a first electrochromic, conductive layer 240 comprising a first electrochromic, conductive polymer disposed on nonelectrically conductive fiber 230, and a first electrolyte layer 250 comprising a first stretchable polymeric electrolyte disposed on the first electrochromic, conductive layer 240. The second fiber electrode 220 is woven in another direction (i.e., perpendicular as shown in FIG. 2). Second fiber electrode 220 comprises an electrically conductive fiber 260. The electrically conductive fiber 260 can be any of the electrically conductive materials, such as an electrically conductive metal (e.g., stainless steel), an electrically conductive organic material, a non-conductive fiber rendered electrically conductive (e.g., nylon or spandex fiber coated with a conductive, nonelectrochromic polymer), and the like. Again, while a woven fabric having the fibers in perpendicular relationship is shown, the fibers can be oriented in any direction relative to each other.

Conductive circuit 270 connects first electrochromic fiber electrode 210 and second fiber electrode 220 to electrical potential generator 280. Rather than requiring a joint as shown in FIG. 3, a conductive interface between first and second fiber electrodes 210 and 220 can be formed by simple pressure contact between the electrically conductive fiber 260 and the electrolyte layer 250. Contact at the intersection point of the first electrochromic fiber electrode 210 and the second fiber electrode 220 forms a continuous conductive path from one fiber electrode to the other.

A method of forming an electrode as shown in FIG. 2 comprises weaving a first thread electrode and a second thread electrode; wherein the first thread electrode and the second thread electrode are independently electronically addressable, and wherein the first thread electrode and/or the second thread electrode comprises an electrochromic material and a stretchable polymeric electrolyte. In one embodiment, the electrode has the form of a woven sheet. In another embodiment, the electrode comprises a woven pattern of two or more thread electrodes, wherein the two or more thread electrodes display a multi-colored visual image in response to an applied electrical potential.

Stretchable electrochromic devices can be constructed using the individual fiber electrodes of FIG. 1 or the fabrics exemplified by FIG. 2. The electrochromic devices are capable of displaying a still or animated color image composed of a combination of red, green, and blue visible light.

Displaying occurs typically by reflection or transmission of visible light rather than by emission when the electrochromic material is subjected to an electrical potential. The individual fiber electrodes and/or the fabrics comprising the fiber electrodes can be used to form a flexible garment. Although the entire garment can be electrochromic, the devices formed from fiber electrodes can be incorporated into other, existing fiber systems; for example by weaving an electrochromic patch or swatch into a portion of another piece of clothing.

In still another embodiment, a plurality of the electrochromic fibers can be used to manufacture a woven or nonwoven fabric wherein the individual electrochromic fibers are not independently addressed. In this embodiment, the fabric as a whole acts as a single addressable electrode. While these fabrics are generally in the form of a 2-dimensional woven or nonwoven planar sheet, their enhanced flexibility permits them to be shaped into 3-dimensional conformations such as a rolled sheet, a folded sheet, a twisted sheet, a coiled sheet, or other configuration.

Electrochromic fibers used to form a fabric can be individually coated with an electrolyte, as in FIG. 1, or the fabric can be coated or impregnated with the stretchable polymeric electrolyte after assembly with the electrochromic fibers. Alternatively, the fabric can be coated with an electrochromic, conductive material or precursor and subsequently coated or impregnated with the stretchable polymeric electrolyte. Non-conductive fibers can be present, as well as conductive, non-electrochromic fibers. The electrochromic fibers can also be used to form nonwoven fabrics.

Electrically conductive fabrics can be obtained from non-conductive fabrics that are subsequently treated to provide conductivity. Such nonconductive fabrics can comprise fibers or yarns of any of the exemplary synthetic and natural non-conductive materials described above. A specific exemplary flexible and elastic nonconductive woven cloth base is spandex, sold under the trade name LYCRA® by Dupont De Nemours. Spandex is a polyurethane containing segments of polyester or polyether polyols that allow the fiber to stretch up to 600% and then recover to its original shape. The fabric can be selected to be both flexible and elastic. For example a flexible, elastic conductive fabric can be obtained by weaving or warp knitting the fabric from nylon and/or spandex fibers or yarns, and then immersed in 100% aniline or an aqueous hydrochloride solution of aniline followed by initiating successive polymerization in a separate bath or mixed bath of oxidant and dopant solution with aniline to provide a poly(aniline) coating on the fabric. The resulting fabrics can be both flexible and elastic. The fabrics are not only more flexible than fabrics formed from metal fibers, but also tend to be lighter and more resistant to oxidation. Because the fibers or yarns can be knit tightly, the electrical conductivity of the fabric can be maintained despite a partial loss of the conductive coating on particular threads, whereas in metal fiber conductive fabrics, the fabric may lose operability after a break in one of the fibers, particularly if the fibers are spaced far apart. Stretch fabrics based on metallized nylons are commercially available from Shieldex Trading, USA.

Flexible, electrically conductive woven and nonwoven fabrics can further be produced by impregnating nonconductive woven or nonwoven fabrics with electrically conductive particulate fillers. The electrically conductive particles can comprise any of the electrically conductive metals, e.g., powdered stainless steel or organic polymers as described above, or other conductive particles such as ITO, carbon nanotubes, carbon black, graphene, and the like. The size, shape, and concentration of these particles can be varied to vary the conductivity of the fabric. In a specific embodiment, a non-conductive woven or nonwoven fabric is treated with a bonding agent (e.g., an organic polymer precursor or organic polymer, such a a poly(acrylate)) containing the electrically conductive particles. Nonwoven polyester stretch fabrics of this type are commercially available from Krempel Group.

Figure 5:
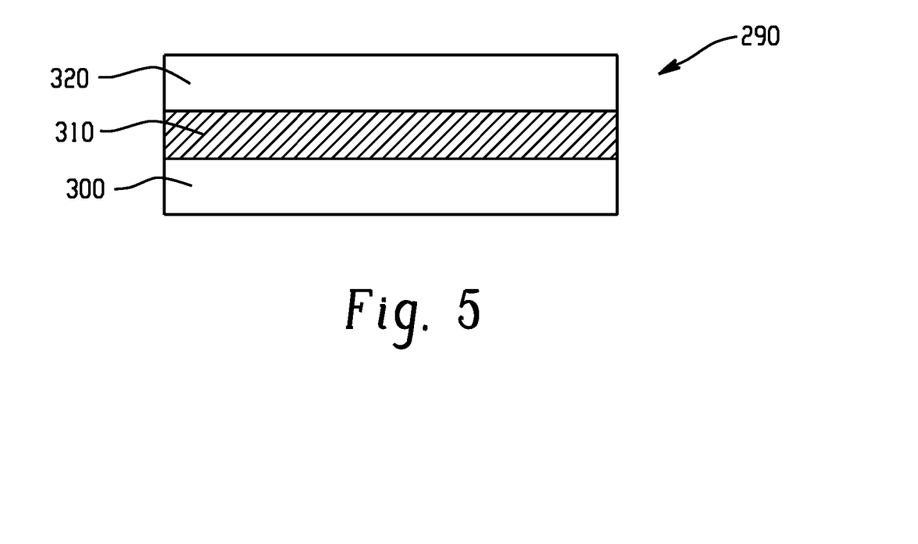
FIG. 5 is a schematic cross-sectional view of an electrochromic fabric electrode.

The conductive fabric (or nonconductive fabric that has been rendered conductive) can be coated with an electrochromic material (described above) to produce an electrochromic fabric electrode for an electrochromic device. The electrochromic fabric electrode also comprises a layer of stretchable polymeric electrolyte. This is exemplified in the schematic cross-sectional view of electrochromic fabric electrode 290 is shown in FIG. 5 (individual fibers are not shown). The electrochromic fabric electrode 290 comprises a conductive fabric 300, which can be any of the exemplary conductive fabrics described above. An electrochromic layer 310 is disposed on one face the conductive fabric. Alternatively, the conductive fabric can be embedded in a layer of an electrochromic material (not shown). A second layer 320 comprises a stretchable polymeric electrolyte disposed on electrochromic layer 310. Alternatively, electrochromic layer 310 and conductive fabric 300 can be embedded in the stretchable polymeric electrolyte (not shown).

Figure 6:
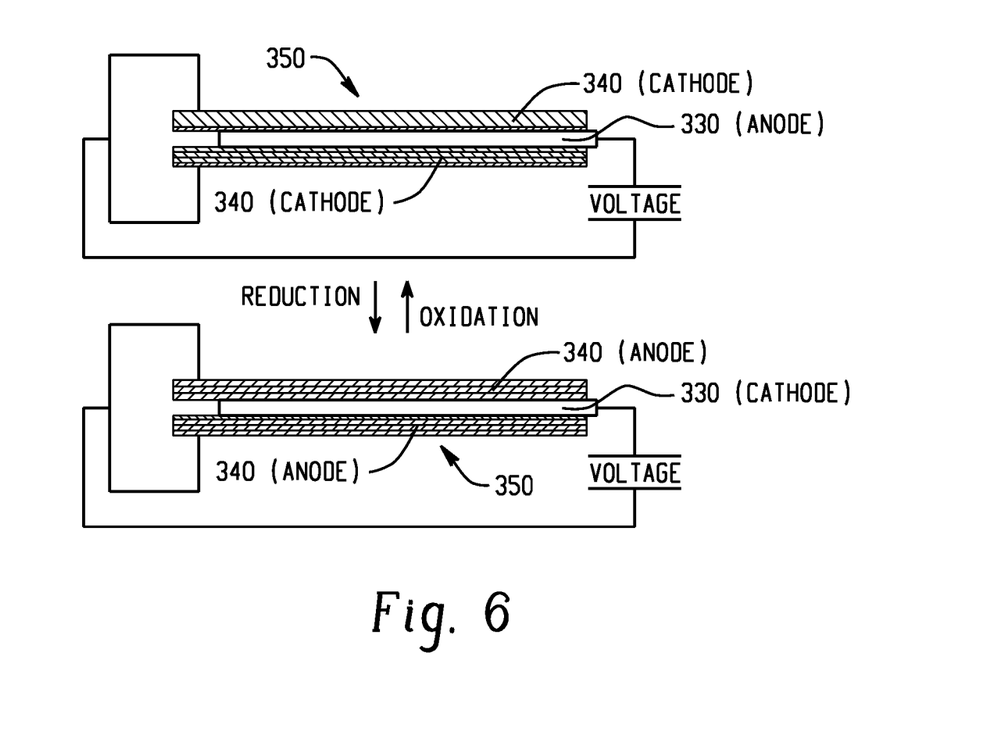
FIG. 6 is a schematic cross-sectional view of an electrochromic fabric electrode containing an electrochromic materials disposed on both faces of a conductive fabric, and the effects of switching polarity on the color of the electrochromic material.

In a variation on electrode 290, the conductive fabric can be treated on both faces with an electroconductive and electrochromic material, as shown schematically in the layer diagram of FIG. 6. Electrochromic fabric electrode 350 contains electrochromic layer 340 disposed on each face of conductive fabric layer 330. Each electrochromic layer 340 is electronically addressable. FIG. 6 also illustrates the effect of changing polarity on the color response of the electrochromic layers 340. When conductive fabric layer 330 acts as the cathode and the electrochromic layers 340 act as the anode (lower diagram), the electrochromic material in layer 340 undergoes reduction to display the same color on each face of the cathode, as represented by the first cross hatching. Alternatively, when conductive fabric layer 330 acts as the anode and the electrochromic layers 340 each act as a cathode, the electrochromic material in layers 340 undergoes oxidation, resulting in a second color different from the first color, as represented by the directionally different cross hatching (upper diagram).

In one embodiment, a single electrochromic material is used to form the electrochromic fabric electrode. In another embodiment, two or more electrochromic materials are deposited on the conductive fabric imagewise to form an electrochromic fabric electrode that displays a colored image when subjected to an electrical potential. The colored image can comprise one or more visible colors.

Figure 7:
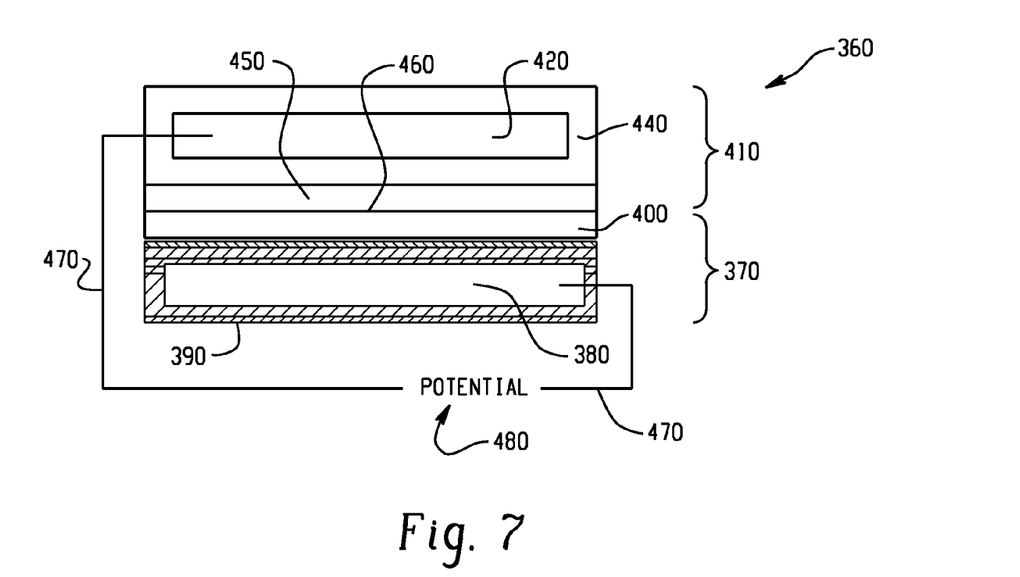
FIG. 7 is a schematic cross-sectional view illustrating an exemplary electrochromic device comprising one electrochromic fabric electrode.
Figure 8:
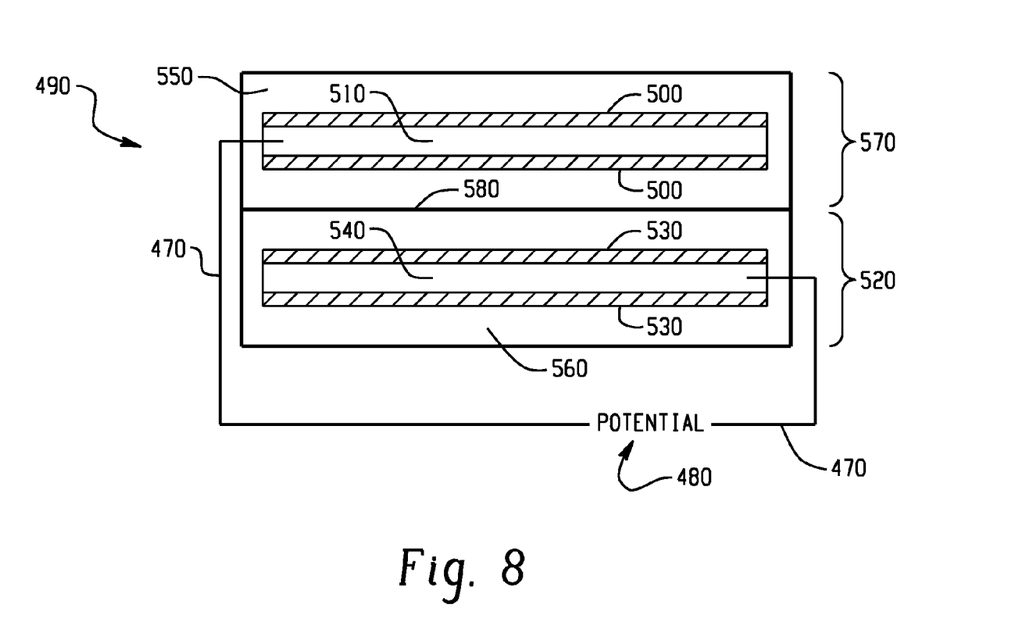
FIG. 8 is a schematic cross-sectional view illustrating an exemplary electrochromic device comprising two electrochromic fabric electrodes.
Figure 9:
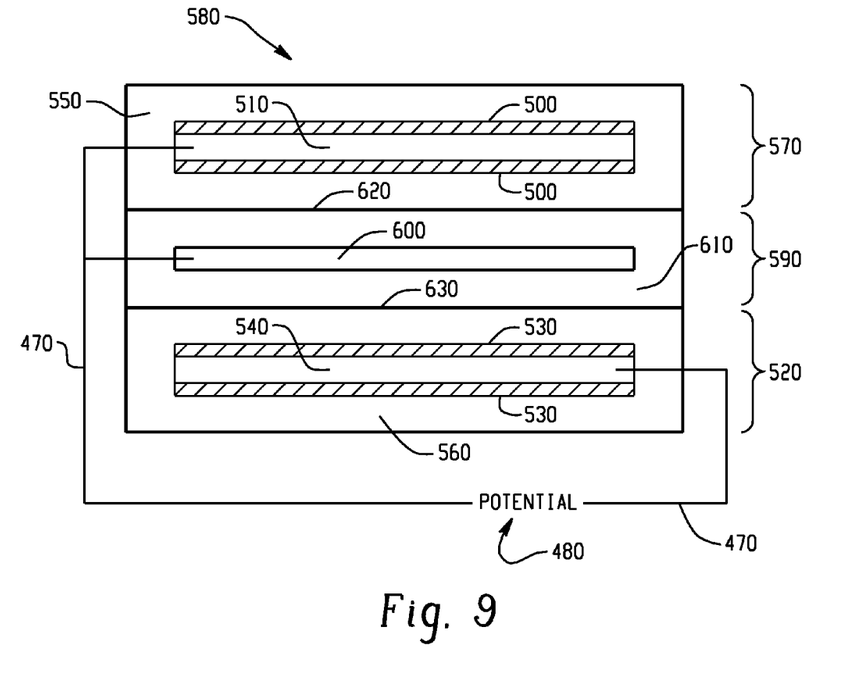
FIG. 9 is a schematic cross-sectional view an exemplary electrochromic device comprising two electrochromic fabric electrodes and one non-electrochromic fabric electrode.

The above-described electrochromic fabric electrodes can be used in a wide variety of different electrochromic device configurations, as exemplified in FIGS. 7-9. The devices can further comprise a non-electrochromic electrode, in particular a non-electrochromic fabric electrode.

FIG. 7 is a schematic cross-sectional view of an electrochromic device 360 comprising a first electrochromic stretchable fabric electrode 370 comprising a first conductive fabric 380 embedded in a first electrochromic layer 390. First electrolyte layer 400 comprising, e.g., a stretchable polymeric electrolyte, is disposed on a face of the first electrochromic layer 390. A second electrode, in particular non-electrochromic stretchable fabric electrode 410, which as shown in this embodiment comprises a nonconductive fabric 420 coated with an organic conductive material 440 and a second electrolyte 450, e.g., a stretchable polymeric electrolyte.

Boundary 460 represents the contact region of first electrochromic fabric electrode 370 with second non-electrochromic fabric electrode 410. The combined thickness of the polymeric electrolyte layers 400 and 450 will depend on manufacturing and use considerations and can be, for example, 50 to 200 micrometers, and even more specifically 75 micrometer to 150 micrometers.

First electrochromic fabric electrode 370 and second non-electrochromic fabric electrode 420 are connected by a conductive circuit 470 (e.g. copper, aluminum, or steel wire) to electrical potential generator 480. Either electrode 370 or 420 can be the anode or the cathode.

FIG. 8 is a schematic cross-section illustrating an electrochromic device 490 comprising a first electrochromic fabric electrode 570 comprising a first electrochromic material 500 disposed on or surrounding first conductive fabric 510, and a second electrochromic fabric electrode 520 comprising a second electrochromic material 530 disposed on or surrounding second conductive fabric 540. First electrochromic fabric electrode 570 further comprises an electrolyte layer 550 comprising, e.g., a stretchable polymeric electrolyte, and second electrochromic fabric electrode 520 further comprises an electrolyte layer 560 comprising, e.g., a stretchable polymeric electrolyte. Either electrode 570 or 520 can serve as the anode or cathode. Each electrode 570 and 520 can reversibly change color in response to an applied electrical potential. Further, electrodes 570 and 520 can display the same color or different colors simultaneously. Typically, when each electrode comprises the same electrochromic material, the electrodes display different colors simultaneously, due to the electrochromic material undergoing oxidation at the cathode and reduction at the anode, a so-called "dual electrochromic" design. In one embodiment, the first and/or second electrochromic fiber electrodes 570, 520 can be a flexible, elastic material, such as spandex or nylon, coated with an electrically conductive and/or electrochromic material.

FIG. 9 illustrates a schematic cross-sectional view of an exemplary electrochromic device 580 comprising a first electrochromic fabric electrode 570, a second electrochromic fabric electrode 520, each as described in FIG. 8, and a third non-electrochromic fabric electrode 590 disposed between first and second electrochromic fabric electrodes 570 and 520. Third non-electrochromic fabric electrode 590 comprises a third conductive fabric 600 and a third electrolyte layer 610 comprising, e.g., a stretchable polymeric electrolyte surroundingly disposed on third conductive fabric 600. As before, each electrode 570, 520, and 590 can serve as an anode or cathode in the electrochromic device. In this case, electrode 570 and 520 will coexist as an anode or a cathode and electrode 590 will be its complement. Boundary 620 indicates a first conductive interface between fabric electrodes 570 and 590. Boundary 630 indicates a second conductive interface between fabric electrodes 590 and 520. Third non-electrochromic fabric electrode 590 allows the same electrical potential and polarity to be applied simultaneously or alternately to the first and the second electrochromic fabric electrodes 570 and 520. Thus, when first and second electrochromic fabric electrodes 570 and 520 comprise the same electrochromic material, the same color change can be effected from each electrode. Alternatively, first and second electrochromic fabric electrodes 570 and 520 can have different electrochromic materials, or receive different polarities simultaneously, to form different colors simultaneously, or simultaneously switch multiple colors. In one embodiment, the first and/or second electrochromic fabric electrodes 570, 520 can be a flexible, elastic material, such as spandex or nylon, coated with an electrically conductive and electrochromic material.

Any of the above-described electrochromic devices comprising the fiber electrodes or the fabric electrodes can further comprise an optional protective layer disposed on one or more exposed faces of the electrodes. The properties of the optional protective layers can vary depending on the intended use. Desirable properties include transparency and/or surface texture that imparts the feel of traditional fabric. Non-limiting examples of materials for such purposes include any stretchable polymer including thermoplastic polyurethane or thermoplastic polyureas.

Also disclosed are photovoltaics (e.g. Gratzel cells), photovoltaic fabrics, and batteries comprising a stretchable electrolyte. These fabrics and batteries can then be integrated into the electrochromic fabric devices disclosed herein or other portable electronics (e.g. electronic garments, e-papers, etc.) where there is a need for the electrolyte to withstand twisting and folding without breaking.

The following illustrative examples are provided to further describe how to make and use the polymers and are not intended to limit the scope of the claimed invention.

EXAMPLES

Example 1

Preparation of a Stretchable Electrolyte

A combination of Duracast™ E900 (a MDI-terminated polyether prepolymer having low free MDI content prepared by the reaction of a polyether and diphenylmethane diisocyanate (MDI), commercially available from Chemtura) and chain extender Duracure™ C3 (a delayed action diamine curative which is approximately 47% dispersion of methylene dianiline/sodium chloride complex in dioctyl adipate (DOA) commercially available from Chemtura) is used as the TPU prepolymer. Dimethylformamide (2.5 milliliters (ml)) is added to 0.5 grams (g) of the TPU prepolymer and 0.05 g chain extender is then added and the mixture is heated to about 80° C. to dissolve the solid prepolymer. 1-Butyl-3-methylimidazolium hexafluorophosphate ((BMIM)$PF_6$) (0.14 g) ionic liquid is then added to the solution to form a stretchable polymeric electrolyte premix. The premix can be coated on any porous substrate, including stretchable porous substrates. Systematic ionic conductivity measurements were carried out on the stretchable polymeric electrolyte. The ionic conductivity of the stretchable polymeric electrolyte is expected to be around $10^{-3}$ to $10^{-2}$ S/cm. The stretchable polymeric electrolyte has a percent elongation at break value of over 100%.

Example 2

Preparation of a Fabric Substrate Impregnated with Stretchable Polymeric Electrolyte The stretchable polymeric electrolyte premix of Example 1 is drop cast onto a fabric substrate and the liquid on fabric is allowed to air dry for about 30 minutes. A layer of transparent, stretchable polymeric electrolyte forms on the fabric substrate as the solvent evaporates. Not wishing to be bound by theory, but it is theorized that the ionic liquid acts as a physical crosslinking agent such that the bonds between the ionic liquid and the polymer can be broken and reformed during stretch-release cycles, and therefore add to the stretchability of the polymer.

Example 3

Preparation of an Electrically Conductive Fabric Substrate Impregnated with Stretchable Polymeric Electrolyte

A spandex fabric sample (polyurethane-polyurea copolymer fabric; Lubrizol) is immersed in an aqueous dispersion of PEDOT-PSS commercially available from Agfa under the trade name Orgacon™. Alternatively, the aqueous dispersion of PEDOT-PSS could be spray coated, drop cast, or inkjetted onto the fabric. The coated spandex fabric is allowed to air dry. The originally white fabric is now a light blue and electrically conductive. The material is fully flexible, stretchable, and deformable and retains its conductivity after such deformation. The material does not appear white after stretching, indicating that the PEDOT-PSS conducting polymer is incorporated into the strands of the fabric itself and is not merely coated on the surface (i.e., it has been absorbed into the fabric).

The stretchable electrolyte premix of Example 1 is drop cast onto the PEDOT-PSS fabric substrate and the liquid on the fabric is allowed to air dry for about 30 minutes. A layer of transparent, stretchable electrolyte forms on the fabric substrate as the solvent evaporates. The electrochromic material of the fabric undergoes normal redox cycles.

Example 4

Mechanical Stress/Strain Study

A stretchable electrochromic device is assembled from spandex fabric and analyzed for mechanical properties stress and strain using TA Instruments dynamic mechanical analyzer model DMA 2980. A spandex fabric sample (polyurethane-polyurea copolymer fabric; Lubrizol) is soaked in an aqueous dispersion of PEDOT-PSS commercially available from Agfa under the trade name Orgacon™ and allowed to air dry to form a sample "PEDOT" of spandex impregnated with conductive material. The "PEDOT" sample is then spray coated on one side with precursor electrochromic material (BEDOT-T)-octyl$_2$ silylene precursor polymer P(BEDOT-T) to form "Electrochromic"

Finally, the fabric "Electrochromic" is soaked a stretchable electrolyte premix according to Example 1 and then allowed to air dry to form a stretchable electrolyte and final stretchable electrochromic device ("Device").

Figure 10:
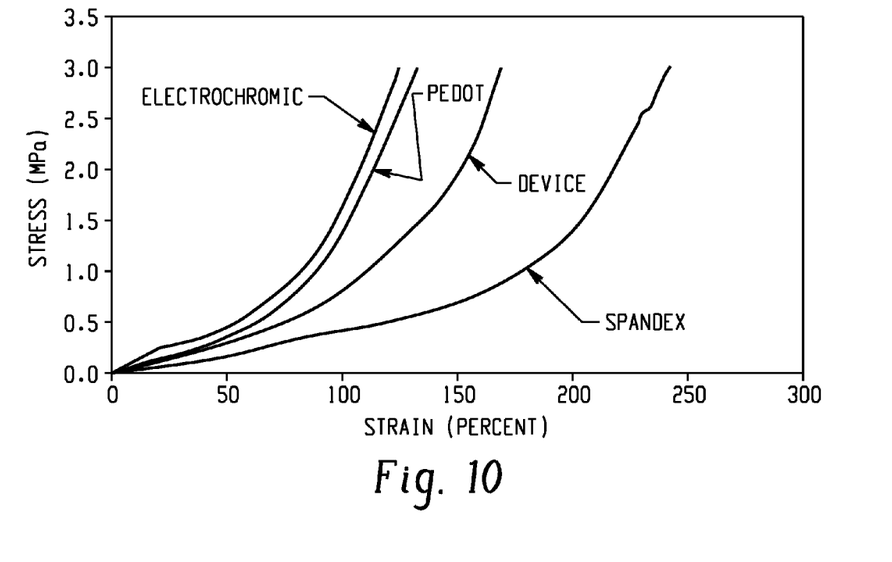
FIG. 10 is a schematic of stress/strain curves for different elements of a flexible electrochromic device.

As shown in FIG. 10, the "Spandex" sample, which contains no PEDOT-PSS, electrochromic, or stretchable polymeric electrolyte, exhibits the most flexibility. The spandex sample with PEDOT-PSS "PEDOT" exhibited significantly less flexibility, as did the "Electrochromic" sample. However, by soaking the "Electrochromic" sample in the stretchable electrolyte premix followed by drying, resulted in the fabric to soften and become much more similar mechanically to the unaltered spandex sample as evidenced by the shift in the curve to the right in FIG. 10 for the "Device". It was surprising that the end electrochromic device would be stretchable and functional as the application of the PEDOT-PSS ("PEDOT" sample) and electrochromic material ("Electrochromic" sample) lost significant flexibility/stretchability as compared with starting unaltered spandex sample ("Spandex"). The inherent flexibility/stretchability of the spandex fabric was lost by the application of the PEDOT-PSS and electrochromic. However, the use of the stretchable polymeric electrolyte resulted in a restoration of some of the lost flexibility/stretchability.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All ranges disclosed herein are inclusive and combinable.

The essential characteristics of the present invention are described completely in the foregoing disclosure. One skilled in the art can understand the invention and make various modifications without departing from the basic spirit of the invention, and without deviating from the scope and equivalents of the claims, which follow. Moreover, any combination of the above-described elements in all possible variations thereof is encompassed by the invention unless otherwise indicated herein or otherwise clearly contradicted by context.

What is claimed is:

1. A stretchable electrochromic device, comprising:
    a stretchable conductive substrate;
    an electrochromic material disposed on or impregnating the stretchable conductive substrate to form a stretchable electrochromic substrate; and
    a stretchable transparent polymeric electrolyte coating or impregnating the stretchable conductive substrate, the stretchable electrochromic substrate, or a combination thereof;
    wherein the stretchable transparent polymeric electrolyte comprises a thermoplastic polyurethane, a thermoplastic polyurea, or a combination thereof, and a salt;
    wherein the thermoplastic polyurethane and thermoplastic polyurea are not chemically crosslinked; and
    wherein the thermoplastic polyurethane is prepared from a thermoplastic polyurethane prepolymer, and the thermoplastic polyurea is prepared from a thermoplastic polyurea prepolymer.

2. The device of claim 1, wherein the salt is an ionic liquid.

3. The device of claim 2, wherein the salt comprises
    halide, tetrafluoroborate, hexafluorophosphate, bistrifluoromethanesulfonimide, triflate, tosylate, formate, alkylsulfate, alkylphosphate, or glycolate anion; and
    lithium, a 1-alkyl-3-methylimidazolium, a 1-alkylpyridinium, or a N-methyl-N-alkylpyrrolidinium.

4. The device of claim 2, wherein the salt is 1-butyl-3-methylimidazolium hexafluorophosphate, 1-ethyl-3-methylimidazolium hexafluorophosphate, pyridinium chloride, a lithium salt, or a combination thereof.

5. The device of claim 1, wherein the stretchable electrochromic substrate is a stretchable conductive fabric or stretchable conductive fiber comprising an electrochromic material.

6. The device of claim 1, wherein the electrochromic material is disposed on a stretchable conductive fiber or disposed on or impregnating a stretchable conductive fabric.

7. The device of claim 5, wherein the stretchable conductive fabric or stretchable conductive fiber comprises spandex, nylon, or a combination thereof.

8. The device of claim 1, wherein the electrochromic material is a conjugated polymer.

9. The device of claim 8, wherein the conjugated polymer is a poly(thiophene), a poly(pyrrole), a poly(aniline), poly (acetylene), poly(p-phenylenevinylene) (PPV), a poly(3,4-alkylenedioxyhetero cycle), poly(3,4-ethylenedioxythiophene) (PEDOT), poly(3,4-propylenedioxythiophene) (PPropOT), and poly(1,4-bis[(3,4-ethylenedioxy)thien-2-yl)]-benzene) P(BEDOT-B), poly(2,5-bis[(3,4-ethylenedioxy)thien-2-yl]-thiophene) P(BEDOT-T), PEDOT-PSS, a poly(vinylpyridine), sulfonated polythieno[3,4-b]thiophene polystyrenesulfonate, polymers derived from electrochromic precursors of structures (III)-(X), or a combination thereof.

10. The device of claim 1, further comprising
at least two electrodes, and
a potential source in electrical connection with the at least two electrodes,
wherein at least one of the electrodes comprises one or more of the stretchable electro chromic substrate.

11. An article comprising the device of claim 1.

12. The article of claim 11, wherein the article is a garment, and the stretchable electrochromic device forms all or a portion of the garment.

13. A method of forming a stretchable electrochromic device, comprising:
a. disposing an electrochromic material on a surface of a stretchable conductive substrate to form an electrochromic substrate, or
b. impregnating a stretchable conductive substrate with an electrochromic material to form an electrochromic substrate; and
   i. disposing a stretchable polymeric electrolyte premix on the electrochromic substrate to form a stretchable electrochromic device, or
   ii. impregnating an electrochromic substrate with a stretchable polymeric electrolyte premix to form a stretchable electrochromic device;
wherein the stretchable polymeric electrolyte premix comprises a thermoplastic polyurethane prepolymer, a thermoplastic polyurea prepolymer, or a combination thereof, and a salt.

14. The method of claim 13, wherein the stretchable conductive substrate is a stretchable fiber or fabric.

15. The method of claim 14, further comprising weaving or entangling the fiber to form a fabric.

16. The method of claim 13, wherein
disposing the electrochromic material comprises disposing a electrochromic precursor, and polymerizing the electrochromic precursor to form a polymeric electrochromic material; or
impregnating the stretchable conductive substrate with an electrochromic material comprises impregnating stretchable conductive substrate with a electrochromic precursor, and polymerizing the electrochromic precursor to form a polymeric electrochromic material.

17. The method of claim 13, wherein the stretchable polymeric electrolyte premix comprises a thermoplastic polyurethane prepolymer, a thermoplastic polyurea prepolymer, or a combination thereof;
a curative;
a salt; and
an organic solvent.

18. A stretchable electrochromic device, comprising:
at least two electrodes,
a stretchable polymeric electrolyte disposed between the electrodes, and
a potential source in electrical connection with the at least two electrodes, wherein at least one of the electrodes comprises one or more stretchable electrochromic fibers or fabrics, wherein the stretchable transparent polymeric electrolyte comprises a thermoplastic polyurethane, a thermoplastic polyurea, or a combination thereof, and a salt.

19. A device, comprising
a stretchable transparent polymeric electrolyte comprising a salt and a thermoplastic polyurethane, a thermoplastic polyurea, or a combination thereof;
wherein the device is a photovoltaic or a battery.

* * * * *